United States Patent

Lu et al.

[11] Patent Number: 6,078,378
[45] Date of Patent: Jun. 20, 2000

[54] LIQUID CRYSTAL DISPLAY WITH PIXELS HAVING AN OPENING FORMED FROM A PHOTOSENSITIVE RESIN WITH SPACERS ATTACHED

[75] Inventors: Yong-Hong Lu, Hsinchu Hsien; Dai-Liang Ting, Hsinchu, both of Taiwan

[73] Assignee: Industrial Technology Research Institute, Hsinchu, Taiwan

[21] Appl. No.: 08/977,196

[22] Filed: Nov. 24, 1997

[51] Int. Cl.[7] .................................................. G02F 1/1339
[52] U.S. Cl. .......................... 349/155; 349/156; 349/187
[58] Field of Search ................................. 349/155, 156, 349/187

[56] References Cited

U.S. PATENT DOCUMENTS 5,539,546  7/1996  Koden et al. .............................. 359/51
5,546,208  8/1996  Shimizu et al. ........................... 359/81
5,643,471  7/1997  Onishi et al. ............................. 349/155

*Primary Examiner*—Walter Malinowski

[57] ABSTRACT

A method for controlling the cell gap of a liquid crystal display device is disclosed. A photo-sensitive polymer layer is coated over a substrate on which color filter, ITO and black matrix of the liquid crystal display device are formed. Spacers are uniformly sprayed and adhered on the photo-sensitive polymer. With a negative-type photo-polymer, a photo-mask can be used to expose the area of photo-sensitive polymer layer covering the the black matrix. The masked area is exposed, developed and removed by a conventional photo-lithographic process. The spacers attached to the masked area are also removed. The size of the spacers attached on the polymer above the thin-film transistors and the black matrix controls the cell gap.

5 Claims, 6 Drawing Sheets

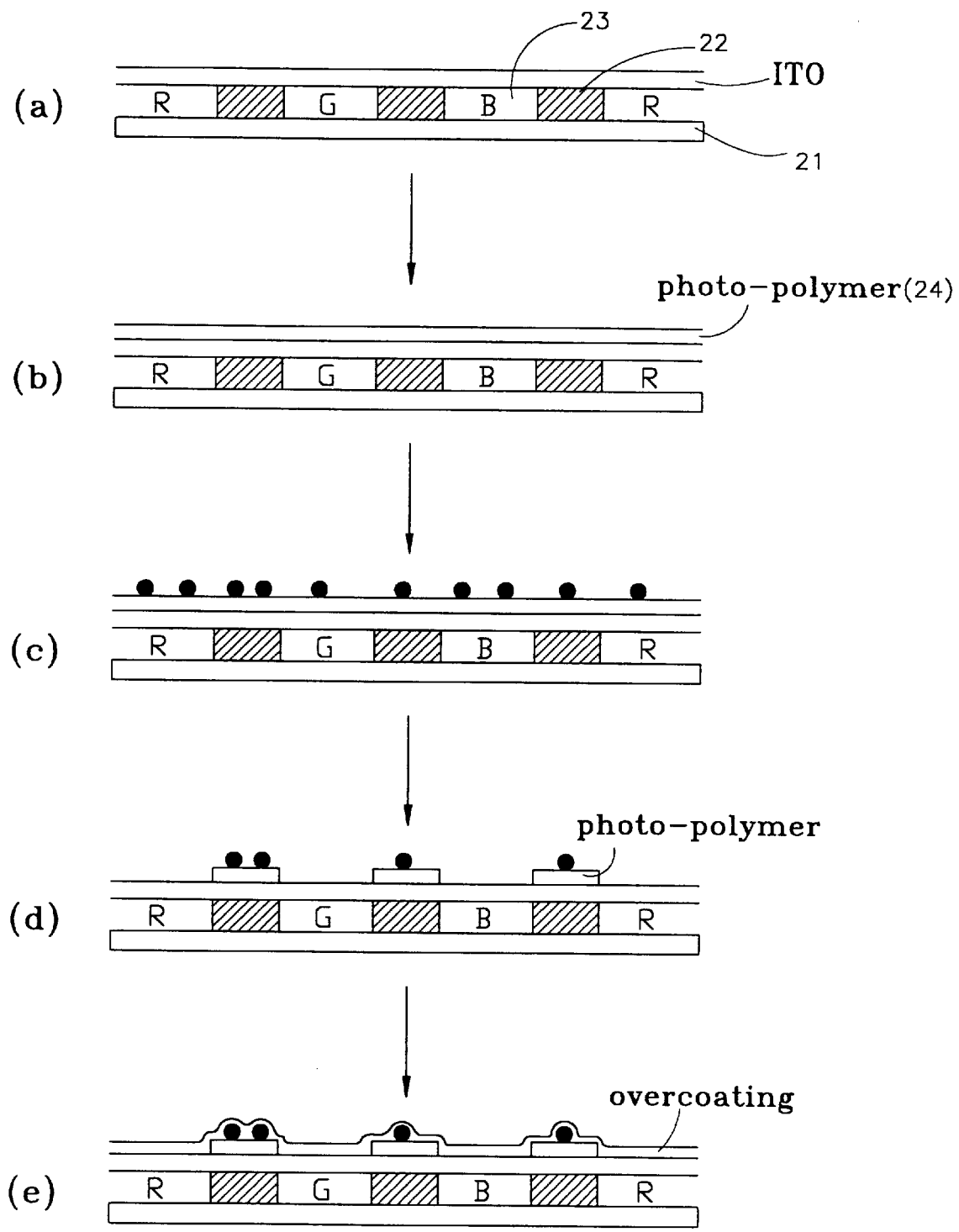
F I G. 4

LIQUID CRYSTAL DISPLAY WITH PIXELS HAVING AN OPENING FORMED FROM A PHOTOSENSITIVE RESIN WITH SPACERS ATTACHED

FIELD OF THE INVENTION

The present invention relates to liquid crystal display devices, and more specifically to the control of cell thickness in manufacturing liquid crystal display devices.

BACKGROUND OF THE INVENTION

A liquid crystal display (LCD) device comprises a pair of substrates having transparent electrodes or switching devices, arranged to face each other with a space in which a liquid crystal material is filled. Spacers are typically placed between the two substrates in order to maintain a gap and control the thickness formed by the substrates. FIG. 1 shows a conventional LCD with spacers between the substrates. The conventional LCD structure comprises an upper polarizer 11, a middle structure including liquid crystal cells 12 and spacers 13, a lower polarizer 14, and a light is source 15.

It is important that an LCD device has a uniform cell gap to achieve high contrast, wide viewing angle and low color distortion. In general, For a twisted nematic (TN) LCD, the accuracy of the uniform thickness of the cell gap has to be controlled within ±0.1 $\mu$m. For a super twisted nematic (STN) LCD, it requires that the spacing be controlled within ±0.05 $\mu$m for high quality. A conventional method of manufacturing spacers in a thin-film transistor (TFT) LCD is illustrated in FIG. 2. Spacer balls are uniformly sprayed and distributed on top of the substrate as shown in FIG. 2.

The main drawback in the LCDs manufactured by the conventional approach is that the spacers may block some of the pixel area. The pixel aperture ratio is thus decreased due to the spacers. Both the brightness and the contrast of the display are degraded. The problem becomes very severe for LCDs having a smaller pixel size. As an example, for projection type or high definition LCDs, the pixel size can be as small as 40 $\mu$ms. If a spacer ball of a 5 um size falls in a pixel area, the quality of the displayed picture is greatly impacted.

Techniques of maintaining the spacing between the LCD substrates have been presented to overcome the problems associated with spacer balls. U.S. Pat. No. 5,268,782 of Wetiz et al. discloses a liquid crystal display device using micro-ridged polymeric substrates for maintaining a precise and uniform spacing between substrates. H. Yamanaka et al. presented a paper titled "Integrated Black Matrix on TFT Arrays" in SID 92 DIGEST for manufacturing an integrated black matrix that includes pigment-dispersed photo-polymer on TFT array in order to improve aperture ratio. H. Yamashita et al. published a paper titled "Precise Cell-Thickness Control by Spacer-Ball-Free Structure and its Application to Large-Size TFT LCDs" in SID 96 DIGEST for controlling the cell thickness by a stack of spacer-ball-free hybrid column structure that combines organic black matrix and color filter layers.

FIG. 3 shows an LCD device having photo-polymer layers to control the thickness of the cell gap. It can be seen that the pixel area is not blocked by any spacer ball. This type of technique, however, has a drawback in that it is difficult to fabricate a photo-polymer layer with substantial thickness such as 5~6 $\mu$ms required in an LCD device. Two photo-polymer layers are often required to form a column stack structure. The structure may also be manufactured by fabricating a photo-polymer layer on each of the top and bottom substrates. The two photo-polymer layers are then aligned to control the thickness of the cell gap. The process and cost of manufacturing LCDs are increased due to the formation of two photo-polymer layers or the difficulty in the alignment. A better method for controlling the cell thickness in the fabrication of LCDs is highly desirable in the industry.

SUMMARY OF THE INVENTION

The present invention has been made to overcome the above mentioned drawbacks and satisfy the need of manufacturing LCDs with uniform cell gap. The object of this invention is to provide a method for controlling the cell gap of LCDs without blocking pixel openings in order to improve the quality of the display.

According to this invention, a photo-lithographic process for fabricating a photo-polymer layer and a conventional method of spraying spacer balls are combined to provide adequate cell gap control of an LCD. By coating a layer of photo-polymer above the substrate with black matrix, color filter and ITO or the substrate with TFT and then spraying spacer balls on top, the spacer balls that fall in the pixel areas of the LCD can be electively removed in the following photo-lithographic process. The LCD devices manufactured with the method of this invention have higher quality because a higher aperture ratio can be obtained.

BRIEF DESCRIPTION OF THE DRAWINGS

FIG. 4 illustrates the process of cell gap control of this invention in manufacturing an LCD device.

DETAILED DESCRIPTION OF THE PREFERRED EMBODIMENTS

Figure 1:
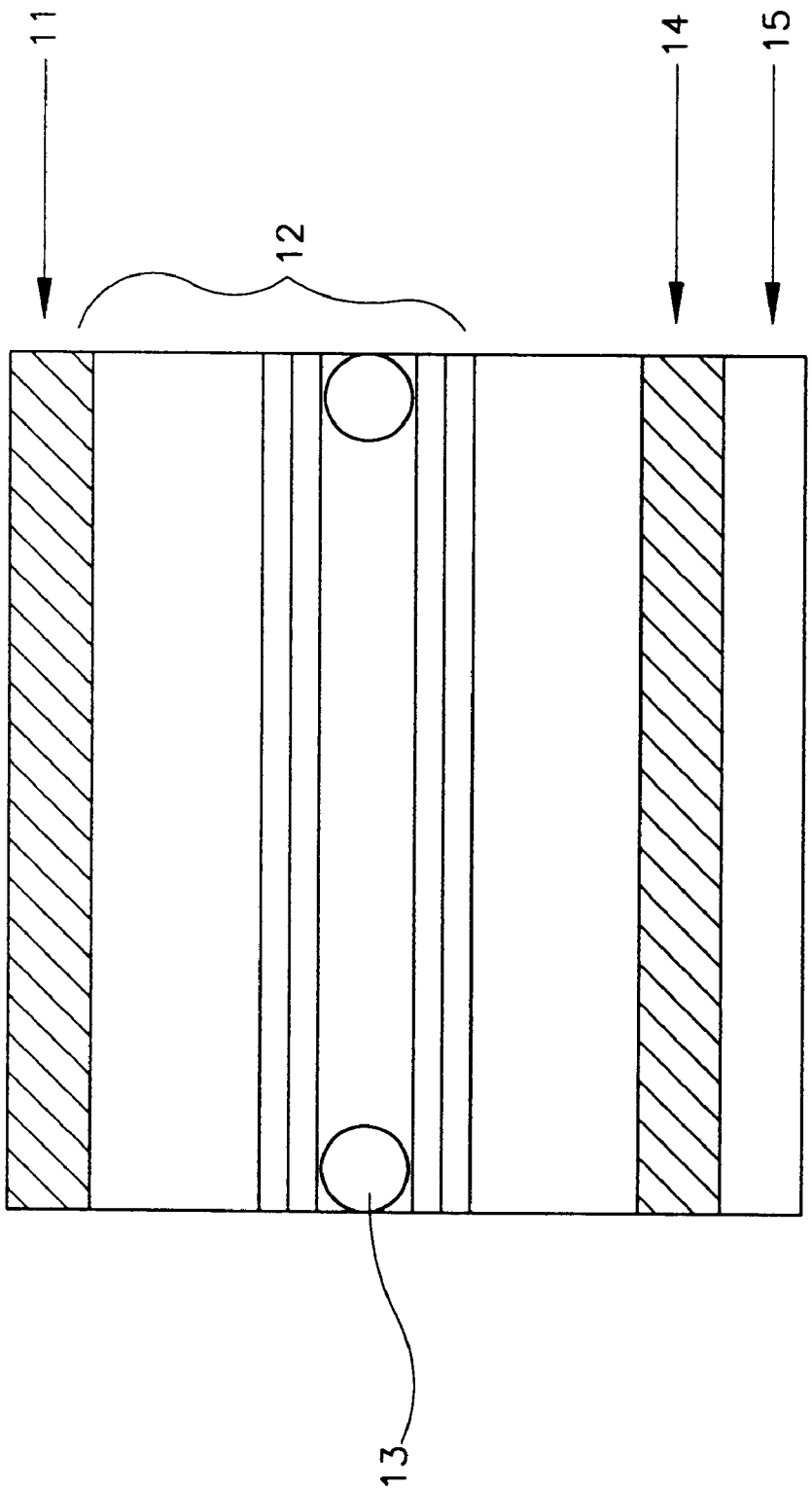
FIG. 1 shows a conventional LCD device having spacers between the substrates.
Figure 2:
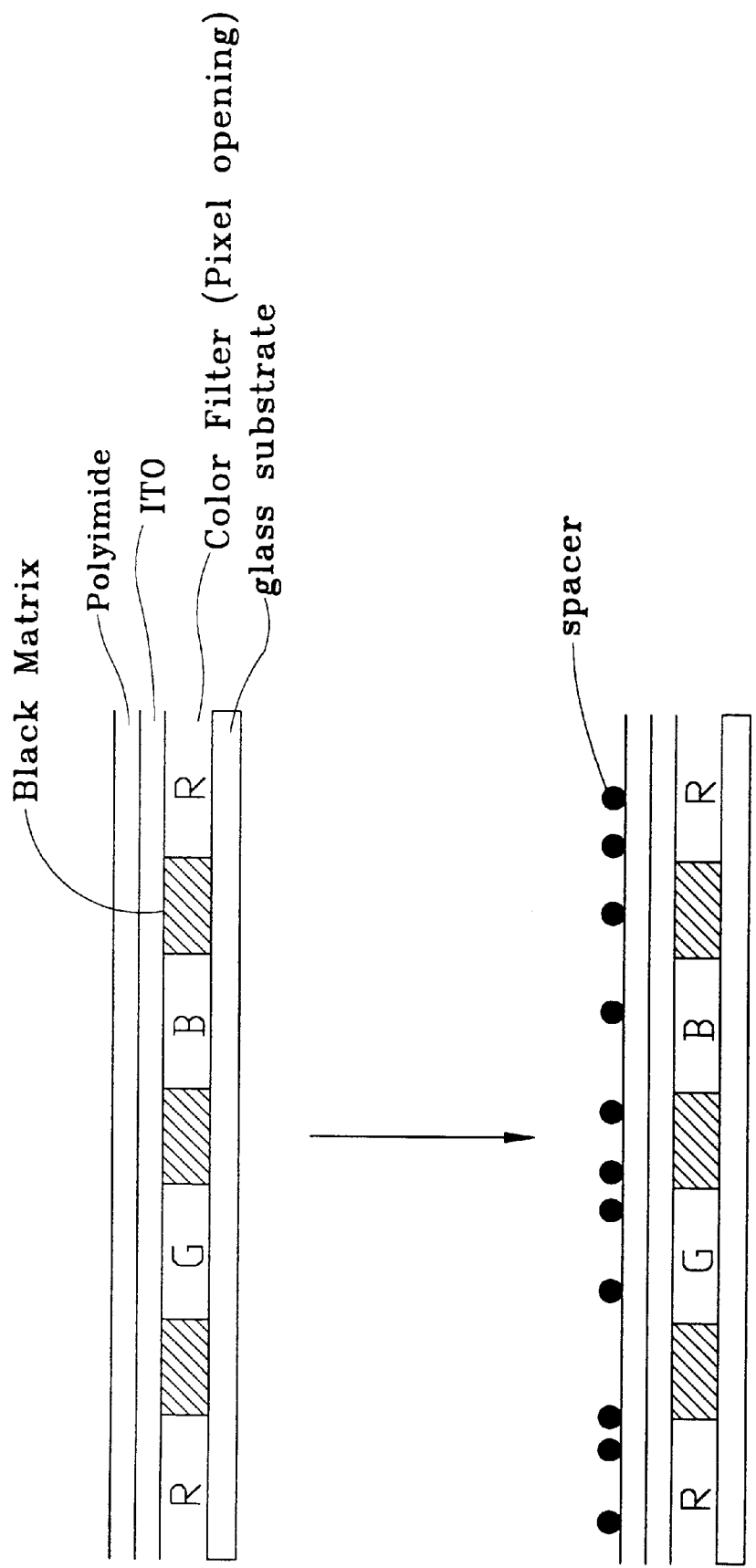
FIG. 2 shows a conventional method of manufacturing spacers in an LCD.
Figure 3:
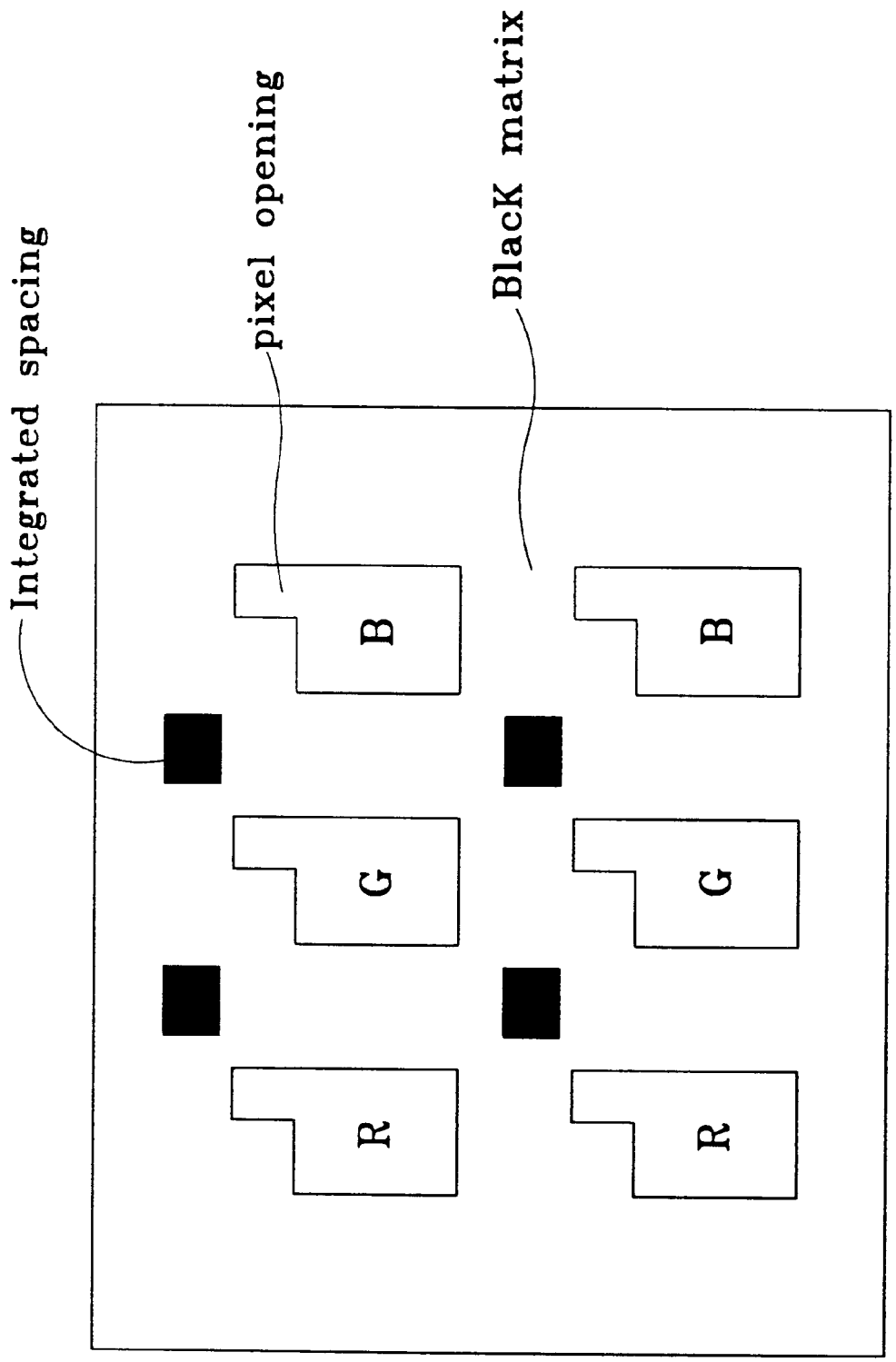
FIG. 3 shows an LCD device having a photo-polymer structure to control the thickness of a cell gap.

FIG. 4 illustrates the process of combining a photo-polymer layer and spacer balls for maintaining a cell gap. An LCD substrate 21 with black matrix 22 and pixel openings 23 (color filter) is shown in FIG. 4(a). For maximizing the aperture ratio of a pixel, the pixel opening 23 should not be blocked by any spacers fabricated for controlling the cell gap. A photo-polymer layer 24 is first coated on top of the device as shown in FIG. 4(b). The photo-polymer can be a negative-type or positive-type photo-resist. The thickness of the photo-polymer layer can be in the range of 0.05 to 3 $\mu$ms. Because the thickness is not critical and can be as thin as 0.1 $\mu$ms, the coating does not require any special process. The photo-polymer layer is dried by a prebake process.

Spacers are then uniformly sprayed over the photo-polymer layer and adhered thereon by a conventional method as shown in FIG. 4(c). The conventional photolithographic technique is used to selectively remove the photo-polymer layer that covers the pixel openings 23. If a negative-type photo-resist is used, a photo-mask is patterned to expose the black matrix and mask the pixel openings. After the photo-polymer layer is exposed to a light source, the pixel opening area that has not been exposed is developed and removed. Because the spacers are attached to the photo-polymer, in the pixel opening area they are also removed along with the photo-polymer. The pixel opening is therefore not blocked by any spacers. A postbake process finally finishes the photo-polymer layer. Alternatively, the spacer could be protected by an overcoating layer after photo-lithographic process, and then printing the polyimide layer. FIG. 4(d) shows the cross-sectional view of the finished photo-polymer layer. FIG. 4(e) shows that a protection layer has been over coated on top of the spacers and the photo-polymer layer. The material of the protection layer may be a negative-type photo-sensitive, positive-type photo-sensitive or thermo-curable material. The protection layer can further be patterned by a conventional photo-lithographic process which exposes and develops the layer to form a desired pattern.

According, to this invention, it is also feasible to perform light exposure of the photo-polymer layer before spraying the spacers on the layer. After attaching the spacers on the photo-polymer layer, the spacers that fall in the area where photo-polymer has been exposed and developed will be removed as well. The thickness of the photo-polymer layer can be very thin and the total desired thickness of the cell gap can be controlled by using different sizes of spacers. There are spacers of various sizes available commercially. Therefore, the cell gap can be controlled to a desired thickness easily.

Figure 5:
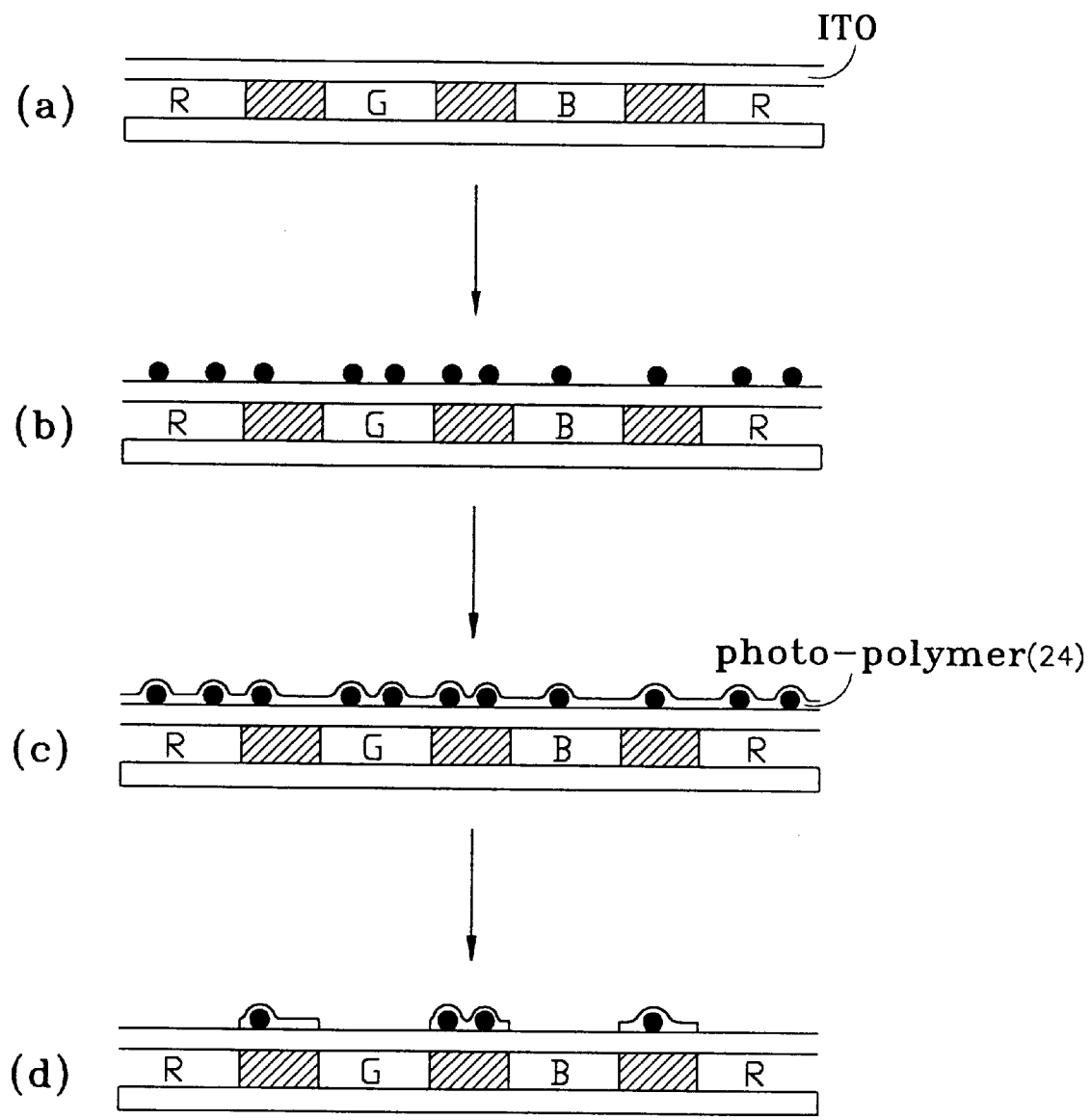
FIG. 5 illustrates another process of cell gap control of this invention in manufacturing an LCD devices.
Figure 6:
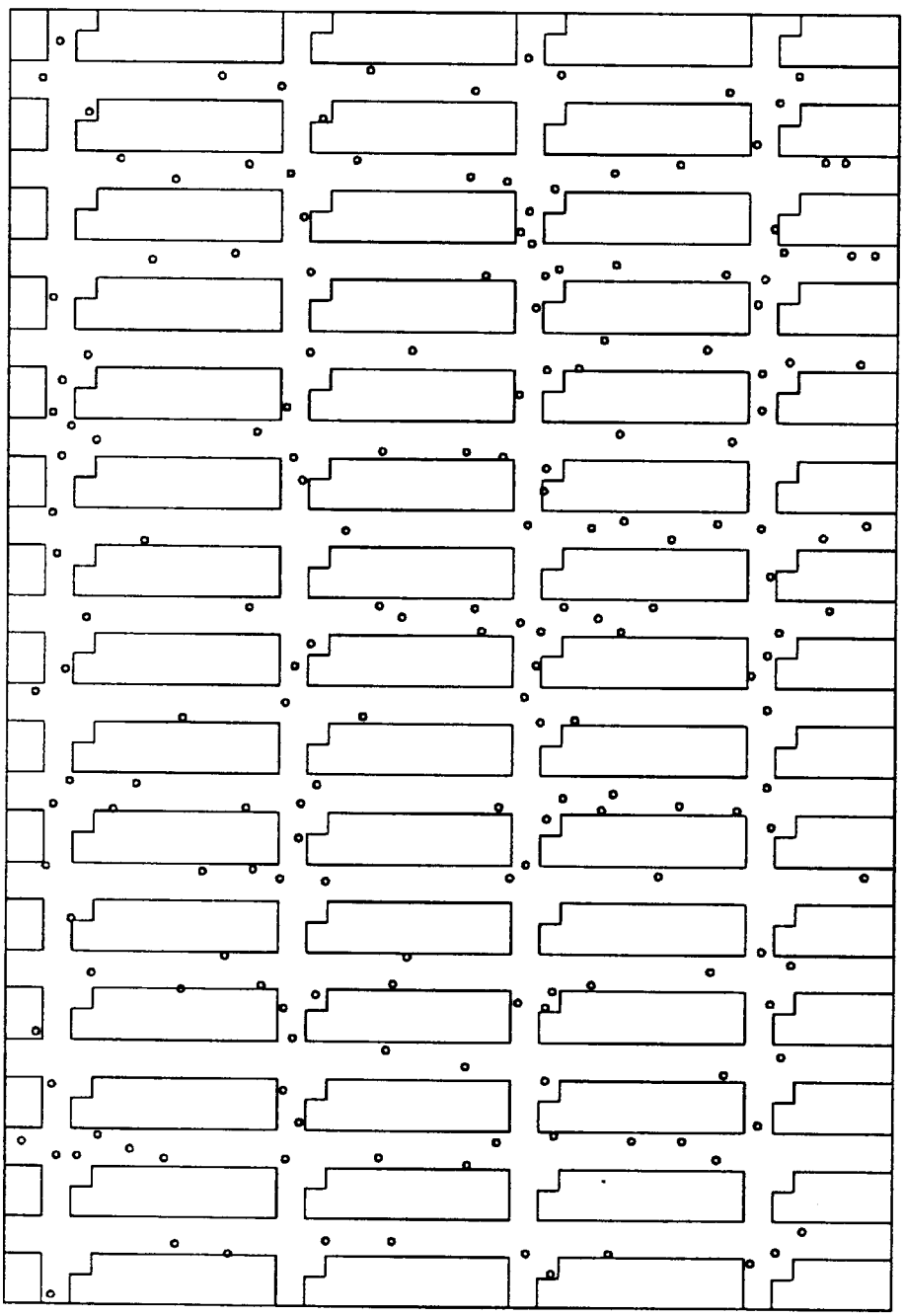
FIG. 6 shows the top view of a finished photo-polymer layer on an LCD substrate manufactured by the method of this invention.

FIG. 5 demonstrates another process of this invention for controlling the cell gap of a liquid crystal display. Firstly, the spacer balls are uniformly sprayed and distributed on top of the color filter plate. A photo-polymer 24 is coated on top of the plate as shown in FIG. 5(c), and then the desired pattern was obtained by a photo-lithographic process. The photo-polymer is a negative-type or positive-type photoresist. The thickness of the photo-polymer and the photo-lithographic process used in the process of FIG. 5 are the same as those in the process of FIG. 4. FIG. 6 shows a top view of a finished photo-polymer manufactured by the method of the present invention.

The method of this invention requires only one photo-lithographic process. The coating of it thin photo-polymer layer is also a well known and established technique. As a result, the method provides a stable and controllable approach for maintaining uniform cell gap. The photo-polymer should comprise a transparent photo-sensitive material. The transparent material may be either positively or negatively photo-sensitive. Materials that are commonly used for fabricating color filters are also applicable. The aperture ratio of the LCD device manufactured by this invention is high because no pixel openings are blocked. Consequently, high brightness and contrast as well as a wide viewing angle can be achieved. If the method of this invention is used to fabricate a TFT LCD device, the substrate as described above is a TFT plate.

What is claimed is:

1. A method for controlling a cell gap between two substrates of a liquid crystal display, comprising the steps of:

preparing a substrate for said liquid crystal display, said substrate comprising a plurality of pixels each having a pixel opening, black matrix and ITO manufactured thereon;

coating a photo-sensitive layer above said substrate for covering the pixel opening and black matrix of each pixel;

prebaking said photo-sensitive layer;

spraying and attaching a plurality of spacers uniformly on said photo-sensitive layer;

using a photo-mask for exposing a first portion of said photo-sensitive layer to a light source and masking a second portion of said photo-sensitive layer, said first portion covering the black matrix of each pixel, and said second portion covering the pixel opening of each pixel;

developing and removing the second portion of said photo-sensitive layer for exposing the pixel opening of each pixel; and post-baking the first portion of said photo-sensitive layer.

2. The method for controlling a cell gap according to claim 1, further comprising a step of over-coating a protection layer on top of said spacers, said photo-sensitive layer and said substrate.

3. The method for controlling a cell gap according to claim 2, wherein said protection layer is further patterned by a photo-lithographic process including exposing and then developing said protection layer.

4. The method for controlling a cell gap according to claim 2, wherein the material of said protection layer is a negative-type photo-sensitive, positive-type photo-sensitive or thermo-curable material.

5. The method for controlling a cell gap according to claim 1, wherein said substrate is a TFT plate.

* * * * *